FIG. I

March 10, 1970  A. N. NESMEYANOV ET AL  3,499,379
INSTALLATION FOR PRODUCING PROTEIN SYNTHETIC GRANULAR CAVIAR
Filed Aug. 9, 1967  2 Sheets-Sheet 2
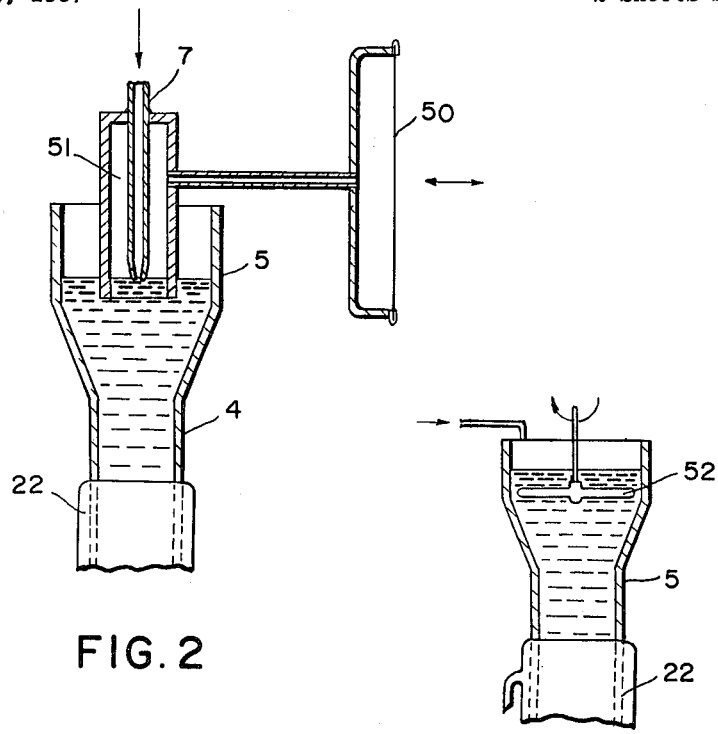
FIG. 2
FIG. 3
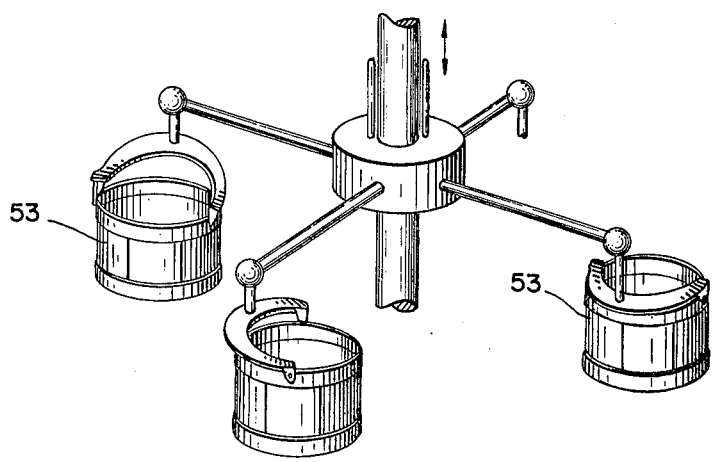
FIG. 4

United States Patent Office 3,499,379
Patented Mar. 10, 1970

3,499,379
INSTALLATION FOR PRODUCING PROTEIN SYNTHETIC GRANULAR CAVIAR
Alexandr Nikolaevich Nesmeyanov, Leninskie Gory, MGU, korpus K, kv. 105; Sergei Vasilievich Rogozhin, Ulitsa Vavilova 55/5, kv. 52; Grigory Lvovich Slonimsky, Ulitsa Chkalova 1/4, kv. 16; Vladimir Ivanovich Misjurev, Poselok Krasny Mayak 16, kv. 15; Vladimir Borisovich Tolstoguzov, B. Polyanka 34, kv. 6; Vladimir Ilich Malakhov, Sadovo-Chernograyazskaya ulitsa 5/9, kv. 101; Natalia Vladimirovna Batenina, Leninsky prospekt 60/2, korpus 7, kv. 73; Vera Alexandrovna Ershova, Staro Konjushenny pereulok, 14, kv. 1; Vladimir Sigzmundovich Dzyavgo, Ulitsa Vavilova 17, kv. 157, all of Moscow, U.S.S.R.; and Vladimir Ivanovich Grekov, Podolsky Paion, Pavlovskoe 39, Moskovskaya Oblast, U.S.S.R.
Filed Aug. 9, 1967, Ser. No. 659,499
Claims priority, application U.S.S.R., Aug. 10, 1966, 1,096,004
Int. Cl. A23b 9/00; A23l 1/10
U.S. Cl. 99—234
15 Claims

ABSTRACT OF THE DISCLOSURE

The installation produces protein synthetic granular caviar from an aqueous solution, suspension or emulsion of food substances; it comprises a vessel adapted to contain a cooling liquid non-miscible with water, means for delivering at least one stream of liquid food substances and for breaking it into drops in said vessel thereby congealing the drops in said cooling liquid and producing granules, means for accumulating the granules, means for washing said granules, means for spraying said granules with a tanning agent thereby forming a membrane on the surface of said granules and means for dyeing and flavoring said granules.

---

The present invention relates to installations for producing food products, and more particularly to installations for producing synthetic granular caviar.

The installation of the invention is intended, particularly, for implementing the method proposed earlier for the preparation of synthetic granular caviar from an aqueous solution, suspension or emulsion of food substances by mixing said solution with gelatin and shaping jelly-like granules from the mixture thus obtained, then tanning said granules, and subsequently adding flavouring agents thereto.

The installation, according to the invention, comprises means for delivering a stream of the starting liquid food products and for breaking up said stream in drops, the drops being cooled with a water-immiscible liquid in a vessel to shape said drops into granules, and a plurality of means and devices that are consecutively connected with the aforementioned granule-shaping means for accumulating said granules, washing them and forming a membrane on the surface of the granules thus obtained.

Used as a means for delivering the stream of liquid food substances and for breaking it up into drops may be at least one nozzle (spinneret) disposed above the surface of the cooling liquid in the granule-shaping device so that the stream, while being delivered, breaks up in drops above the surface, on the surface, or else in the layer of said cooling liquid.

To adjust the breaking up of the stream of liquid food substances into drops of a required diameter and preclude their subsequent coalescence on the surface or within the layer of the cooling liquid, there may be provided a device for imparting oscillations to the stream in the course of its delivery, or a device for imparting oscillations to the nozzle, or else a device for imparting oscillations to the surface layer of the cooling water-immiscible liquid, and a stirrer for agitating the upper layer of said liquid, the nozzle being either positioned stationary or adapted to form continuous motion in a horizontal plane.

Each of the devices for shaping granules from the thus obtained drops of liquid food substances comprises, in the preferred embodiment thereof, a column containing a water-immiscible cooling liquid and provided with a jacket for the coolant and a conical bottom, the column bottom forming connecting vessels in conjunction with a pipe adapted to transfer formed granules into a receiving tank and to maintain the water-immiscible liquid at a present level in the column.

In the top part of the column there is provided a heater for warming up the upper layer of the water-immiscible liquid in the course of operation of the installation. The bottom and central parts of the column are cooled with the coolant circulating in the jacket, e.g. with water, so that a temperature gradient is set up in the water-immiscible liquid.

The top part of the jacket for cooling the water-immiscible liquid in the column should preferably be connected with the conical bottom of the column by means of a discharge pipe, which arrangement makes it possible to use the coolant, i.e. water, as a carrier fluid for transferring the formed granules that emerge from the layer of the water-immiscible liquid first into the bottom portion of the column, thence into the receiving tank, said coolant being also used for washing said granules.

For a successive transfer of the granules, in the device for their accumulation, their washing, tanning and colouring, a turn-table conveyor should preferably be used with containers made in the form of baskets.

This successive transfer of the granules may also be effected by the carrier fluid, i.e. water, provided said devices are arranged in a cascade manner, include a bottom drain and are interconnected by means of conveying chutes.

The devices for washing, accumulating, tanning and colouring the granules, in the prefered embodiments thereof, are constituted by cylindrical vessels accommodating perforated cylinders to preclude entrainment of the granules by the carrier fluid or by solutions of treating agents.

The installation of the invention may also comprise successively interconnected devices for shaping the granules for their accumulation, spreading, washing, tanning, dyeing, flavouring, and for packing the ready product.

Other objects and advantages of the invention will become apparent from a consideration of a detailed description given hereinbelow, taken in conjunction with the accompanying drawings, in which:

FIG. 1 is a general diagrammatic view of the installation according to the invention in one of its possible embodiments;

FIG. 2 diagrammatically represents the top part of the column of the installation;

FIG. 3 is a diagrammatic view of the top part of the column with a stirrer; and

FIG. 4 shows another possible embodiment of the devices for tanning, dyeing, and flavouring the granules of synthetic caviar.

Figure 1:
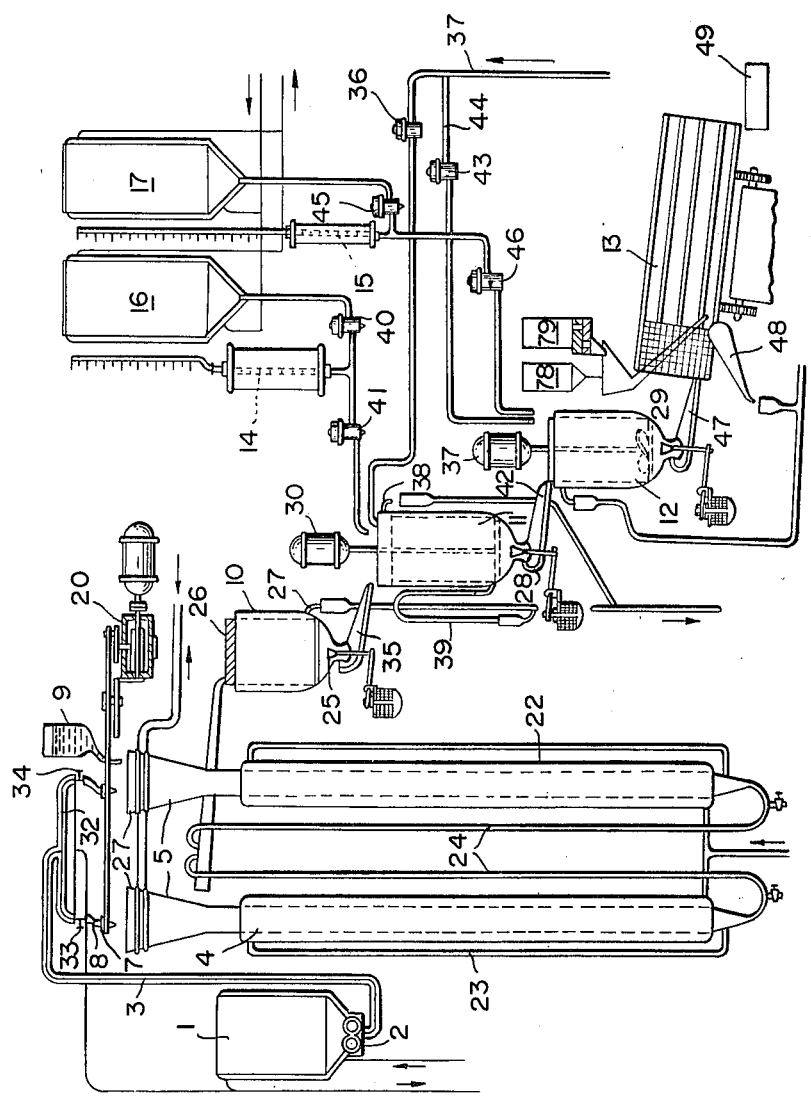

Now referring to FIG. 1, the installation for producing protein synthetic granular caviar comprises a vessel 1 (with a thermostat) for the initial solution, suspension, and/or emulsion of food substances, pump 2, heated pipeline 3, devices for forming a stream of liquid food substances and for breaking it up dropwise, devices for shaping granules, said devices being constituted by columns 4 with inlet funnels 5 and conical bottom 6 filled with a liquid immiscible with the solution, suspension and/or emulsion of food substances. The device for forming a stream of liquid food substances is constituted by nozzle 7 connected by means of flexible hose 8. The installation is provided with feeding tank 9 for maintaining a constant level of the cooling liquid immiscible with the solution of food substances, receiving tank 10 for the granules, devices 14 for washing and tanning said granules, devices 12 for washing the granules from excess tanning agents and for dyeing said granules, devices 13 for mixing the granules with other ingredients required for producing synthetic granular caviar, tanks 14 and 15 for solutions of tanning and dyeing agents, respectively, vessels 16 and 17 for said solutions of tanning and dyeing agents, tanks 18 and 19 for liquid and powdery ingredients of the synthetic granular caviar.

With the help of mechanism 20, the device for delivering a stream of liquid food substances may be caused to move above the inlet funnel 5 in a horizontal plane.

The upper portion of the inlet funnel accommodates heating element 21 for warming up the upper layer of the liquid immiscible with the solution of food substances in the course of installation operation.

The column 4 is provided with jacket 22 for cooling the liquid immiscible with the solution of food substances. The upper portion of the jacket is connected with the conical bottom 6 of the column 4 by means of discharge pipe 23, serving to discharge the cooling liquid from the jacket and to utilize said liquid for transferring the granules via pipe 24 into the receiving tank 10.

The receiving tank 10 for the granules is made as a cylindrical vessel having a spherical bottom with discharge valve 25. In the vessel is provided a perforated cylinder 26. For draining the liquid that carries the granules, the tank is equipped with discharge 27.

The device 11 for washing and tanning the granules and the device 12 for washing off excess tanning and dyeing solutions are similar to the receiving tank and equipped with discharge valves 28 and 29 and stirrers 30 and 31.

The device 13 for mixing the granules with other ingredients is constituted by an inclined rotary drum with internal longitudinal ribs and perforations on the lateral surface.

The installation is provided with a collecting tank for the cooling liquid that transfers the granules, and with a system for the recovery, cooling and circulation of said liquid (not shown in FIG. 1), as well as with discharge valves 25, 28, 29, devices for washing and dyeing the granules, and also with tanks 14 and 15 for the solutions of tanning and dyeing agents, said tanks being equipped with automatic drives integrated in a single electric circuit with a central control panel.

The electric control circuit is provided with a programmed multichannel master unit.

The vessels 16 and 17 for the tanning and dyeing solutions are provided with appropriate jackets for cooling said solutions.

Before starting the installation, the preliminary prepared solution or suspension of protein, substances with appropriate additives is poured into the thermostatted vessel 1, the required temperature being maintained therein by means of a high-precision thermostat (not shown in FIG. 1). The vessels 16 and 17 are filled with cooled solutions of tanning and dyeing agents, respectively.

Water cooled down to the required temperature is fed to the bottom portion of the jacket 22 of the granule-shaping column 4, which water, while going upwards in the jacket, cools the column 4 and, via an upper drain through the discharge pipe 23, flows into the conical bottom 6 of the column 4. On filling the column 4 up to the level of the pipe 24 and after a desired rate of water flow therethrough has been adjusted, the column is filled with a liquid immiscible with the solution of food substances, the density of said immiscible liquid being somewhat lower than that of the starting solution. The lower level of the liquid immiscible with the solution of food substances is set to be some 40–60 mm. above the water inlet into the column 4, and the upper level thereof should be such as to fill the side portion of the inlet funnel 5 some 40–50 mm. below the edges thereof.

A preset adjustment of said level is effected through back pressure of water whose flow rate is controlled by the difference in the water column height or pressure head.

The upper layer of the liquid immiscible with the solution of food substances is heated in the inlet funnel to a required temperature so as to reduce the viscosity and surface tension or pressure.

From the thermostatted vessel 1 the liquid food substances are fed under pressure by means of the pump 2 or by a pressurized inert gas (nitrogen or air) via the heated pipeline 3 to mainfold 32 and further, via the flexible hose 8, to the nozzle (spinneret) 7 which is fixed to the carrier of a crank gear, the latter being adapted to cause the nozzle 7 to travel above the surface of the inlet funnel 5. The rate of feeding the liquid food substances is adjusted by means of needle valves 33 and 34. The stream emerging from the nozzle breaks up in drops, the following three cases being possible:

(1) the stream breaks up in drops above the surface of the water-immiscible liquid, this being the case particularly at a low rate of outflow and a considerable distance between the nozzle and the surface of the water-immiscible liquid;

(2) the stream is distributed over the surface of the liquid immiscible with the solution of food substances and breaks up in drops;

(3) drops are formed within the layers of the liquid immiscible with the solution of food substances, e.g. if the density of the liquid food substances is low, the rate of outflow is considerable and the distance between the nozzle and the surface of the fluid immiscible with the solution of food substances is small.

The drops, penetrating into the layers of the liquid immiscible with the solution of food substances, acquire spherical shape thanks to the surface tension forces. The drop thus formed, falls by gravity, and reaches cooled layers of the cooling liquid. The rate of downward travel of the drop is a function of the difference between the specific gravity of the liquid food products and that of the granule—shaping liquid, as well as of the viscosity of the latter. Thus, during 20–30 min. at a temperature of 4 to 6° C. the drop acquires a gel-like structure sufficiently strong to withstand further treatment of the granules.

The diameter of the drops thus formed depends on the diameter of the nozzle orifice, or solution feed, rate viscosity of the solution, and surface tension.

The granules delivered into the receiving tank 10 are trapped in the perforated cylinder 26 and water is drained from the vessel through the bottom discharge pipe 27 and directed into a separating tank. In the separating tank, water is separated from the water-immiscible liquid and recycled to the columns and the vessel for washing the ready product, this being realized by means of a pump through a cooling chamber (not shown in FIG. 1).

As soon as a sufficient amount of grandules is accumulated in the receiving tank, a corresponding electric contact is closed under control of the signal from the multichannel master unit, whereby the drive of the discharge valve 25 is actuated. The valve 25 opens and the accumulated granules are discharged into chute 35 and therefrom into the washing and tanning device 11. Then the multi-channel master unit closes the required contacts whereby the stirrer 30 is actuated and valve 36 on pipeline 37 is opened for feeding washing water.

The granules are stirred and washed with water to remove the water-immiscible liquid. The latter together with water is drained from the installation through discharge pipe 38. Water is also drained through syphon 39.

While the granules are being washed, the multi-channel master unit closes an appropriate contact, whereupon valve 40 opens and tanning solution from the vessel 16 is fed to the tank 14.

Washing having been completed, the valve 36 is closed, water from the device 11 is drained from the syphon 39, and the granules of synthetic caviar remain in the perforated cylinder.

When an appropriate contact is closed on the multichannel master unit, valve 41 opens, and the tanning solution from the tank 14 is fed to the device 11 where the granules are subjected to tanning. After the tanning cycle is over, a contact on the multi-channel master unit is closed, the discharge valve 28 of the device opens, and the tanned granules of synthetic caviar are delivered via chute 42 into the device 12 for washing and dyeing.

The multi-channel master unit closes its appropriate contacts, the stirrer 31 of the device 12 is actuated and valve 43 on water pipeline 44 is opened. Water is thus fed into the device 12 and then starts the removal of excess tanning solution by washing the tanned granules.

In the course of washing the granules from the excess tanning solution, the next valve is closed on the multichannel master unit, solenoid valve 45 opens, and dyeing solution is fed from the vessel 17 into the tank 15. The granules having been washed from the excess tanning solution, another contact is closed on the multi-channel master unit, and through valve 46 the dyeing solution is fed from the tank 15 into the device 12.

The granules of synthetic caviar having been treated with the dyeing solution, the next contact is closed on the multi-channel master unit, the discharge valve 29 opens, and the dyed granules of synthetic caviar via guide chute 47 are delivered into the perforated portion of the device 13 to be mixed with other ingredients of synthetic caviar, said device 13 being made as a rotary drum. Water is drained through the perforations and along chute 48, and the dyed granules are entrapped by the internal longitudinal ribs of the drum and slide along the inclined rotary drum.

Respective contacts on the multi-channel master unit being closed, the tanks 18 and 19 become opened, and liquid and pulverant ingredients of synthetic caviar are fed into the drum. The ready synthetic caviar is delivered to device 49 for weighing and packing.

The installation of the invention may comprise a device for imparting oscillations to the surface layer of the cooling water-immiscible liquid in the column 4, which column may be made so as shown in FIG. 2.

As diaphragm 50 oscillates, the level of the water-immiscible liquid and pressure in chamber 51 vary, which makes it possible, by changing the oscillation frequency of the diaphragm 50, to adjust the breaking up of the stream into drops of a required diameter. The nozzle 7 is fixed in such a manner as to be movable in an horizontal plane above the level of the water-immiscible liquid. To preclude the coalescence of drops of liquid food substances on the surface or in the layer of the water-immiscible liquid, appropriate means for stirring or agitating said liquid may be installed in the column 4 wthin the upper liquid layer, said means being, for example a stirrer, as shown at 52 in FIG. 3.

In the exemplary embodiment of the proposed installation disclosed herein the granules of synthetic caviar are conveyed from the device for their shaping into that for their accumulation, tanning and dyeing through the intermediary of a carrier fluid. However, the granules may be conveyed from one device into another also mechanically, particularly in such a manner as shown in FIG. 4, viz. in special baskets 53, capable of being displaced successively through devices for tanning, dyeing, etc, arranged circumferentially.

What is claimed is:

1. An installation for producing protein synthetic granular caviar from an aqueous solution, suspension and/or emulsion of food substances comprising in combination: a vessel adapted to contain a cooling water-immiscible liquid; means for delivering at least one stream of starting liquid food substances and for breaking up said stream into drops in said vessel whereby said drops congeal in said cooling water-immiscible liquid to produce granules; means connected in succession with said vessel for accumulating the formed granules; means connected in succession with said last mentioned means for washing the accumulated granules; and means connected in succession with said washing means for subjecting the washed granules to a spray of tanning agent whereby a membrane is formed on the surface of said granules.

2. An installation according to claim 1, wherein said means for delivering at least one stream and for breaking up said stream comprises at least one nozzle of the spinneret type located above the surface of the cooling fluid in said vessel.

3. An installation according to claim 2, wherein said nozzle is arranged above said vessel containing said cooling water-immiscible liquid, and means supporting the nozzle for continuous movement in a horizontal plane.

4. An installation according to claim 2, further comprising means for imparting oscillations to said at least one stream in order to permit adjustment of the breaking up thereof and therefore of the diameter of said drops.

5. An installation according to claim 2, further comprising means for imparting oscillations to said at least one nozzle in order to permit adjustment of the breaking up of said stream and therefore of the diameter of said drops.

6. An installation according to claim 2, further comprising means for imparting oscillations to the surface layer of said cooling liquid in said vessel.

7. An installation according to claim 2, wherein a stirrer is installed in the vessel containing said cooling water-immiscible liquid below the level thereof, said stirrer serving to adjust the breaking up of said stream of liquid food substances into drops of a required diameter and also to preclude coalescence of said drops.

8. An installation according to claim 7, wherein said vessel for the cooling water-immiscible liquid is made as a column with a jacket for the coolant, said column having a conical bottom that forms connecting vessels in conjunction with a pipe adapted to deliver ready granules into said means for accumulating said granules, said pipe also serving to maintain a preset level of the water-immiscible liquid in said column.

9. An installation according to claim 8, wherein a heater is provided in the top part of said column for heating the upper layer of the water-immiscible liquid in the course of installation operation.

10. An installation according to claim 9, wherein the jacket for cooling the water-immiscible liquid is connected in its upper portion with the conical bottom of the column by means of a discharge pipe.

11. An installation according to claim 10, wherein said column and said means for accumulating, for washing and for subjecting to a spray said granules are consecutively connected for ensuring the transfer of said granules by means of said cooling liquid, said means being arranged in a cascade manner.

12. An installation according to claim 10, further comprising means for dyeing the tanned granules, said means for accumulating, for washing, for subjecting to a spray and for dyeing said granules being all arranged in a cascade manner, provided with a bottom drain and interconnected by conveying chutes ensuring successive transfer of said granules by said cooling liquid.

13. An installation according to claim 12 wherein said means for accumulating, for washing, for subjecting to a spray and for dyeing said granules are constituted by cylindrical vessels accommodating perforated cylinders.

14. An installation according to claim 13, comprising a combination of consecutively connected means for shaping granules of synthetic caviar, their accumulation, spreading, washing, tanning, dyeing, flavouring, weighing and packing of the ready product.

15. An installation according to claim 1 comprising a turn-table conveyor with basket containers for transferring the containers between successive means.

References Cited

UNITED STATES PATENTS

| | | | |
|---|---|---|---|
| 1,201,133 | 10/1916 | Askenasy | 99—130 |
| 1,378,084 | 5/1921 | Bacon et al. | 264—13 |
| 2,574,357 | 11/1951 | Stammer et al. | 264—13 XR |
| 2,652,386 | 9/1953 | Wallman | 264—9 |
| 2,830,902 | 4/1958 | Anson et al. | 99—14 |
| 2,911,672 | 11/1959 | Van Ervan Dorens et al. | 264—4 |
| 3,017,668 | 1/1962 | Sundman. | |
| 3,023,171 | 2/1962 | Smith | 264—14 XR |
| 3,060,510 | 10/1962 | Fischer et al. | 264—9 |
| 3,137,630 | 6/1964 | Hecker et al. | 264—14 |
| 3,143,475 | 8/1964 | Koff et al. | 264—13 XR |

FOREIGN PATENTS

| | | |
|---|---|---|
| 1,363,214 | 5/1964 | France. |
| 977,128 | 12/1964 | Great Britain. |

ROBERT W. JENKINS, Primary Examiner